Oct. 27, 1959    S. L. COX    2,910,138
AIR CLEANER
Filed Dec. 24, 1957    2 Sheets-Sheet 1

INVENTOR.
Stanley L. Cox
BY
Murray, Sackhoff & Murray
ATT'YS

Oct. 27, 1959 — S. L. COX — 2,910,138
AIR CLEANER
Filed Dec. 24, 1957 — 2 Sheets-Sheet 2

INVENTOR.
Stanley L. Cox
BY
Murray, Sackhoff & Murray
ATT'YS

United States Patent Office 2,910,138
Patented Oct. 27, 1959

2,910,138

AIR CLEANER

Stanley L. Cox, Cincinnati, Ohio, assignor to The Kirk & Blum Manufacturing Company, Cincinnati, Ohio, a corporation of Ohio Application December 24, 1957, Serial No. 704,945

4 Claims. (Cl. 183—24)

This invention relates to improvements in air cleaners and is directed to a horizontal, wet air cleaner that is efficient and economical to operate and which is particularly adapted as an air precleaning device for thoroughly wetting and entraining solid particles in contaminated air before said air is introduced into the intake of a cyclone type wet dust collector.

An object of the invention is to provide a longitudinally extending liquid containing well in the bottom of an air duct for carrying containmated air and an impeller means partially immersed in said liquid for creating both a rising and a falling curtain of liquid droplets across the moving, contaminated air to thereby wet and entrain foreign particles in the air and carry them into the liquid.

Another object of the invention is to provide an improved motor driven liquid impeller roll which has a novel circumferential configuration for creating a spray or curtain of finely divided droplets across the air inlet conduit of the cleaner and to further provide a means for vertically adjusting the motor driven roll to the level of the liquid in the conduit.

Other objects of the invention will become apparent from the accompanying specification and drawings which illustrate a preferred form of my invention.

Figure 1:
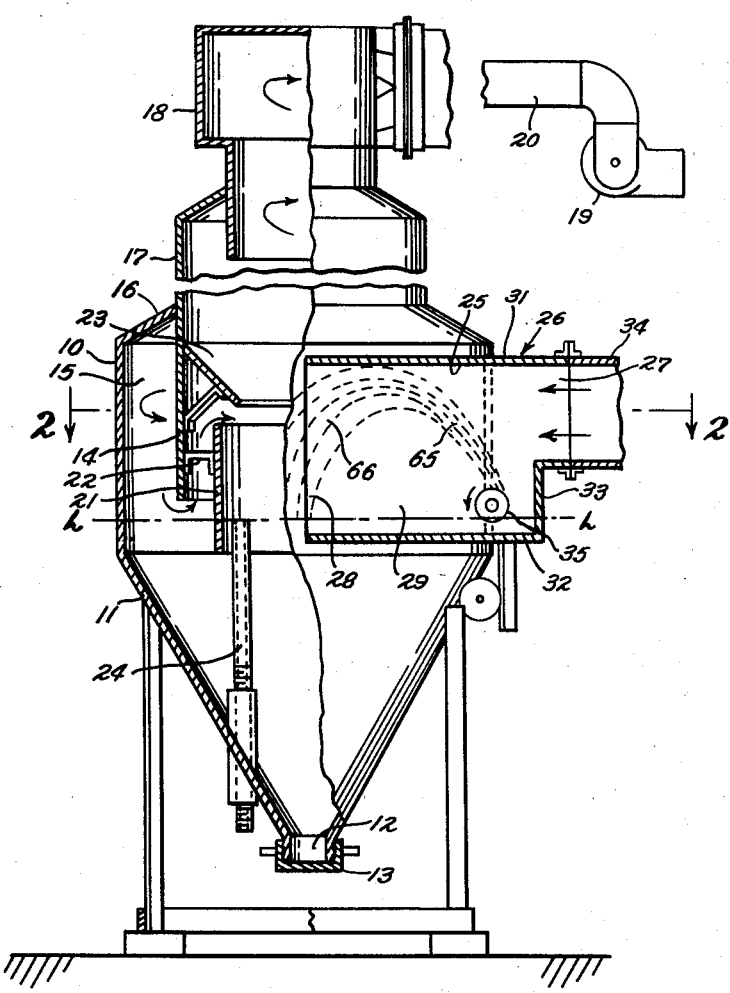
Fig. 1 is a side elevational view of an air cleaning apparatus embodying the invention, parts thereof being broken away to disclose details thereof.

The invention is herein illustrated and described as associated with a more or less conventional cyclone type dust collector and only those parts of the collector which are necessary to a complete understanding of the present invention are herein shown and described in detail. The parts of the collector not shown and described in detail per se form no part of the present invention and are known commercially in the art.

Referring to the drawings, the centrifugal dust collector is of the type disclosed in my Patent No. 2,565,596, granted on August 28, 1951. This collector has an elongated, cylindrical upright outer casing 10 which terminates at its lower end in an inverted, frusto-conical bottom 11 that has formed therein a small sludge removing opening 12 normally closed by a threaded cap 13, or the like. A cylindrical inner casing 14 is positioned co-axially and spaced radially inwardly from the outer casing 10 and forms with the said outer casing an upright circular air duct 15. The inner casing extends vertically upwardly beyond the top of the outer casing whereby the circular air duct 15 is closed at its upper end by an inclined wall 16 connecting the upper edge of the outer casing 10 to the lowermost part of the exposed portion 17 of the inner casing 14. The upper end of the inner casing is suitably connected to a clean air outlet eccentric scroll 18 which in turn is connected to a power exhaust fan 19 by a suitable conduit 20. A cylinder 21 is mounted concentrically within the inner casing 14 by means of suitable brackets 22, the lower end of said cylinder depending below the inner casing 14 into the space formed by the lower portion of the outer casing 10; a suitable baffle ring 23 being positioned within and against the inner surface of the inner casing 14 and in position to overlie the upper edge of the said cylinder 21.

As best shown in Fig. 1 a vertically adjustable overflow pipe 24 is mounted in the bottom 11, the position of its upper inlet end establishing the liquid level L—L for the proper operation of the air cleaner.

Figure 2:
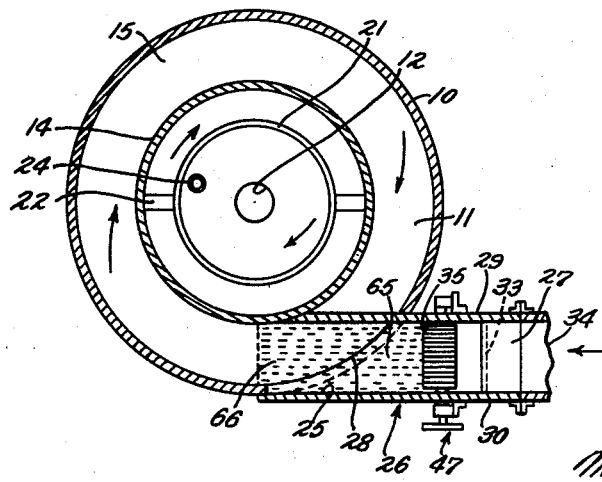
Fig. 2 is a section taken on line 2—2 of Fig. 1.
Figure 3:
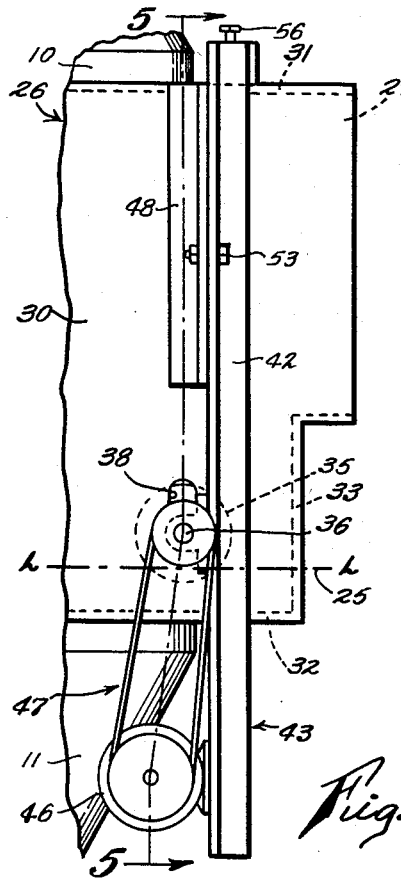
Fig. 3 is an enlarged, side elevational view of the air precleaner for the apparatus shown in Figs. 1 and 2.

As best shown in Figs. 1 and 2 the outer cylindrical casing 11 of the cyclone type air cleaner has a rectangular opening 25 therein which extends from top to bottom of said casing 10 and subtends an angle approximately 45° with respect to the common center of the casings 10 and 14. An intake air precleaner is provided the cyclone type cleaner and comprises a hollow, horizontally elongated, rectangular air duct 26 provided with a restricted, contaminated air inlet opening 27 at the outer end thereof and an air discharge opening 28 at the inner end thereof, said rectangular casing being in open communication with the circular air duct 15 through the opening 25 and disposed tangentially with respect to the outer and inner casing numbers 10 and 14, respectively, to produce a circular air stream within said duct 15. The rectangular duct 26 is best formed by means of a pair of upstanding sidewalls 29 and 30 that are interconnected by top and bottom walls 31 and 32. The sidewall 29 projects through the opening 25 in the outer wall and has its inner end in engagement with the outer face of the inner casing 14, whilst the other three walls of the duct are in airtight engagement against the marginal portions of the outer casing 10 around the opening 25 therein. With reference to Figs. 1 and 3 it will be noted that the bottom wall is somewhat shorter than the top wall 31 and the outer lower portions of the sidewalls 29 and 30 cut away to engage an end wall 33 extending laterally across the lower outer end of the duct 26 to provide the restricted opening 27 for the inlet side of said duct. As shown in Figs. 1 and 2 this inlet opening is connected to a suitable conduit 34 carrying contaminated air to the air cleaner.

The broken line L—L appearing in Figs. 1 and 3 indicates the liquid level that is maintained in the air cleaner at the adjusted level of the overflow pipe 24. It will be noted that at the adjusted level, shown in the drawings, the liquid level is below the bottom end of the inner casing 14, submerges the lower end of the cylinder 21 and fills the bottom of the horizontal duct 26, the lateral wall 33 providing an end barrier for retaining the water in the said duct. As depicted in Figs. 1 and 2 a rising and falling curtain of comminuted liquid droplets is projected into the stream of contaminated air as it passes through the horizontal duct 26. The rising and falling curtain of liquid droplets is created by means of a rotated, impeller roll 35 extending laterally across the outer, lower portion of the horizontal duct, said roll having its lower portion immersed in the liquid contained in the bottom of the duct.

For optimum fluid impelling results the roll 35 must be immersed to a certain depth in the fluid in the horizontal duct and be rotated at a selected speed. As the liquid level in the cyclone cleaner is varied for particular air cleaning conditions it is requisite that the operating position of the roll 35 be vertically adjustable in accordance with varying liquid levels established in the cyclone cleaner. With reference to Figs. 3–7 of the drawings which illustrate details of the horizontal air cleaner of this invention it will be noted that the impeller roll is fixed on a laterally extending shaft 36 that has its oppositely extending ends projecting through aligned, vertically elongated slots 37 and 38 formed in the sidewalls 29 and 30, respectively, of the horizontal air cleaner duct 26. The shaft is journalled in bearings 39 and 40 (Fig. 5) which are in turn bolted to a pair of side members 41 and 42, respectively, of a vertically movable frame 43. The side members straddle the duct 26 and are secured together in a rigid frame by means of an upper cross-member 44 and a number of lower cross-members 45. The lower cross members mount a suitable electric motor 46 which drives the roll 35 through a pulley and belt arrangement, generally indicated by the reference numeral 47.

The means for adjustably securing the frame 43 to the horizontal duct 26 comprises a pair of angle irons 48 and 49 welded or otherwise secured to the sidewalls 29 and 30, respectively, of the duct, said angle irons having vertically elongated slots 50 and 51, respectively, formed therein which receive bolts 52 and 53, respectively, which pass through apertures formed in the side members 41 and 42, respectively, of the frame. Upon vertical adjustment of the frame the bolts may be tightened to hold said frame, the impeller roll and its driving motor in the adjusted position.

Figure 7:
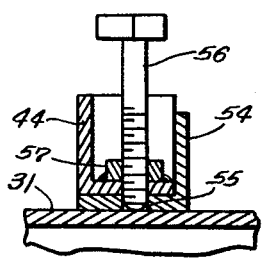
Fig. 7 is an enlarged, sectional view, taken on line 7—7 of Fig. 4, showing a detail of the vertical adjusting device for the precleaner.

The means for effecting vertical adjustment of the impeller roll and its frame is shown in detail in Fig. 7 and comprises an angle iron 54 welded or otherwise secured to the upper wall 31 of the horizontal duct, said angle iron having a suitable hole 55 formed therein for rotatably seating the lower end of an adjustment bolt 56 that is threaded in the cross-member 44 preferably by means of a nut 57 welded to the cross-member 44 and in threaded engagement with the said adjustment bolt 56. By turning the adjustment bolt to the left or right a fine and accurate vertical adjustment of the frame can be made for positioning the impeller roll with respect to the liquid level L—L obtaining in the cyclone air cleaner.

Figure 5:
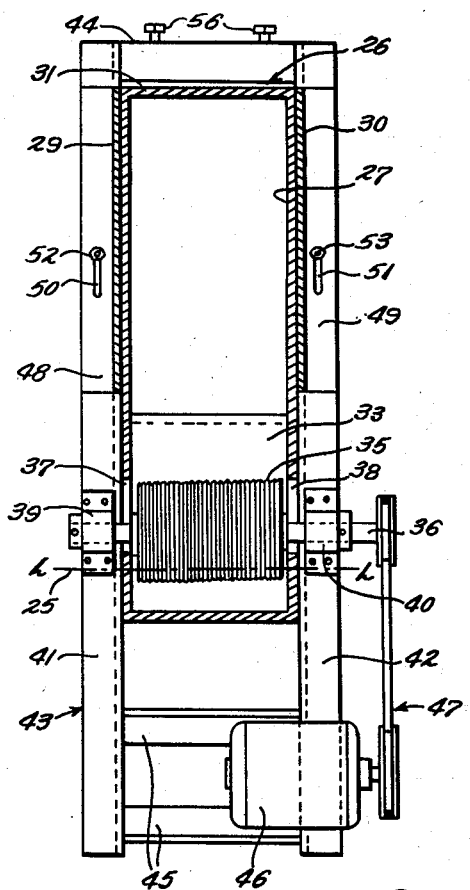
Fig. 5 is a view taken on line 5—5 of Fig. 3.
Figure 4:
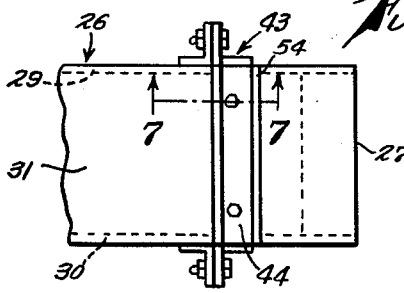
Fig. 4 is a top plan view of the device shown in Fig. 3.
Figure 6:
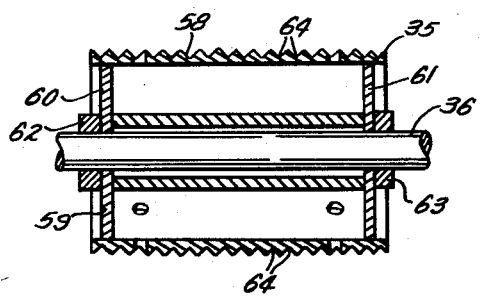
Fig. 6 is an enlarged sectional view of the fluid impeller roll for the precleaner shown in Figs. 3–5.

With reference to Fig. 6 it will be noted that the liquid impeller roll 35 comprises an outer sleeve 58 and a concentric inner sleeve 59 secured together in concentric relationship by means of end disc members 60 and 61 that have their outer peripheries welded to the internal wall of the sleeve 58 and their inner portions welded to the end edges of the inner sleeve 59. Welded to the end walls 60 and 61 are mounting sleeves 62 and 63, respectively, which in turn are secured by set screws, or other suitable fastening means, to the shaft 36. As best shown in Figs. 5 and 6 the outer peripheral surface of the impeller roll is provided with a laterally spaced series of peripheral grooves 64 which create an alternate spaced series of sharp crests on the face of the roll. It is now thought best to make the grooves V-shaped with the rolls diverging outwardly at an angle of 45° and to laterally space the grooves so that sharp crests are formed on the roll whereby upon rotation of the roll at a high speed cohesion of the liquid on the roll and centripetal force will cause the liquid to leave the roll at the high points thereon in the form of comminuted droplets of liquid.

In the operation of the air cleaner it will be understood that the conduit 34 leads from one or more sources of contaminated or dust laden air and is connected to the restricted mouth 27 of the horizontal casing 26 in a known manner. Velocity air movement through the cleaner is obtained by operation of the suction fan 19 which has its intake port connected to the mouth of the eccentric scroll 49 in a suitable manner. The discharge from the fan may be conveyed to any suitable point for release into the atmosphere by means of a conduit or a conduit system (not shown).

Before placing the installation in operation the liquid level L—L for the installation is established by adjusting the vertical position of the discharge pipe 24 and the corresponding vertical position of the impeller roll 35 with respect to the said liquid level so that the impeller will produce optimum liquid impelling results. Now when the fan 19 is operated, velocity air will be drawn through the inlet opening 27 in the horizontal duct 26 and thence through said duct whence it is discharged through the outlet opening 28 into the circular air duct 15 between the outer and inner casing members 10 and 14, respectively, of the cyclone air cleaner. As indicated by the arrows in Figs. 1 and 2 the air stream will take a circular, downward path within the circular duct 15, the downward circular path being abruptly changed to a circular upward path as the air passes between the lower end of the inner casing 14 and the surface of the liquid and up between the space formed by the inner casing 14 and the circular baffle 21. Still maintaining its circulatory path the air will be met with the baffle 23 and there suddenly deflected downwardly into the central portion of the baffle 21 and hence upwardly through the central part of the inner casing 17 and into the scroll 18.

As best shown in Figs. 1 and 2 the impeller roll 35 is positioned across the horizontal duct 26 subjacent the restricted opening 27 in said duct and driven in a counterclockwise direction to create the curtain of water droplets indicated by the reference numeral 65 which rises in a direction inclined away from the stream of contaminated air moving through the duct, and a falling curtain of water droplets indicated by the reference numeral 66 that descends in a direction inclined away from the air stream. The contaminated air stream entering the restricted air inlet opening 27 thereby comes into intimate contact with the rising and falling curtains of water droplets whereby the foreign particles in the air stream are completely wetted and are entrained in the curtains, the heavier and larger amount of said particles being immediately carried by the falling curtain of liquid droplets back into the liquid in the bottom of hte cyclone air cleaner. The remaining wetted particles and the smaller liquid droplets are borne by the stream of air into the circular chamber 11 of the cyclone air cleaner and are carried either into the liquid where the air stream suddenly changes from a downward to an upward direction around the lower edge of the inner casing 14 or are caught on the baffle or on the sidewalls of the inner face of the inner casing and returned therefrom into the liquid in the bottom of the cyclone cleaner.

What is claimed is:

1. An air cleaner comprising a cylindrical upright outer casing having a rectangular opening therethrough and a coaxially positioned, cylindrical inner casing spaced radially from the outer casing and forming therewith a circular air duct, a horizontal, substantially rectangular, hollow air duct having inlet and outlet ends, the outlet end being connected to the rectangular opening in the outer casing to place the interior of the horizontal duct in open communication with the circular air duct, a lateral wall extending across the lower part of the inlet end of the horizontal duct below the inlet opening therein, a liquid sludge basin in the bottom of the outer casing and extending into the bottom of the horizontal duct, said lateral wall providing a liquid barrier across the bottom of the duct, means for maintaining a common liquid level in the bottoms of the outer casing and the horizontal duct, an elongated, transversely extending liquid impeller roll rotatably mounted on the horizontal duct near the inlet end thereof and having its lower portion immersed in the liquid, and means for rotatably driving the roll at a speed and in a rotatory direction to throw a rising curtain of liquid into the path of, and in the same general direction as, the air moving through the horizontal duct and a descending curtain of liquid that falls back into that portion of the liquid basin situated in the bottom of the outer casing.

2. An air cleaner comprising a centrifugal separator of the cyclone type including a cylindrical, upright outer casing having a rectangular opening therethrough, a bottom for said casing forming with the lower portion of the casing a liquid containing sludge basin, a co-axially positioned, cylindrical inner casing spaced radially from the outer casing and having its lower end spaced above the level of the liquid, said inner and outer casings forming a circular air duct for the centrifugal separator, a horizontal substantially rectangular, hollow air duct having inlet and outlet ends, the outlet end being connected to the rectangular opening in the outer casing to place the interior of the horizontal duct in open communication with the circular air duct, a liquid overflow pipe in the sludge basin, means for adjusting the vertical position of the inlet end of the pipe to maintain a common liquid level in the outer casing and in the bottom portion of the horizontal air duct, a lateral wall extending across the lower part of the inlet end of the horizontal duct below the inlet opening therein to provide a liquid barrier for said duct, an elongated, liquid impeller roll extending laterally across the horizontal duct subjacent the inlet opening therein, vertically adjustable means for rotatably mounting the roll on the horizontal duct with the lower portion of the roll immersed ni the liquid in the said duct, and means for driving the roll at a speed and in the rotatory direction to throw a rising and a falling curtain of liquid into the path of the air moving through the horizontal duct.

3. An air cleaner comprising a centrifugal separator of the cyclone type including a cylindrical, upright outer casing having a rectangular opening therethrough, a bottom for said casing forming with the lower portion of the casing a liquid containing sludge basin, a co-axially positioned, cylindrical inner casing spaced radially from the outer casing and having its lower end spaced above the level of the liquid, said inner and outer casings forming a circular air duct for the centrifugal separator, a horizontal substantially rectangular, hollow air duct having inlet and outlet ends, the outlet end being connected to the rectangular opening in the outer casing to place the interior of the horizontal duct in open communication with the circular air duct, a liquid overflow pipe in the sludge basin, means for adjusting the vertical position of the inlet end of the pipe to maintain a common liquid level in the outer casing and in the bottom portion of the horizontal air duct, a lateral wall extending across the lower part of the inlet end of the horizontal duct below the inlet opening therein to provide a liquid barrier for said duct, an elongated, liquid impeller roll extending laterally across the horizontal duct subjacent the inlet opening therein and having its lower portion immersed in the liquid in the bottom of the horizontal duct, an upstanding frame having one end straddling the horizontal duct and carryiny a pair of oppositely positioned bearings, a shaft for the roll passing through aligned openings in the duct walls and having its ends journalled in the bearings, a motor on the opposite end of the frame and having a driving connection with the shaft, fixed guide means on the duct for slidably engaging the frame, and releasable means for securing the frame to the guide means in vertically adjusted positions.

4. An air pre-cleaner for a dust separator having a liquid basin comprising a horizontal, substantially rectangular hollow air duct having inlet and outlet ends, said outlet end communicating with the liquid basin, said duct having a lateral wall extending across the lower part of the inlet end to provide a restricted air inlet opening in said end and a liquid retaining well extending longitudinally along the bottom of the duct, means for maintaining a predetermined liquid level in the bottom of the duct and the basin, an elongated, transversely extending liquid impeller roll rotatably mounted on the duct subjacent the inlet opening therein and having its lower portion immersed in the liquid, means for rotating the roll at a speed and in a rotatory direction to throw a curtain of liquid droplets upwardly, and in the same general direction as, the direction of incoming air in the duct, and said droplets of liquid with the entrained particles falling back into the liquid basin.

References Cited in the file of this patent

UNITED STATES PATENTS

| | | |
|---|---|---|
| 1,243,214 | Petryk | Oct. 16, 1917 |
| 1,754,126 | Stievenart | Apr. 8, 1930 |
| 1,948,278 | Payne et al. | Feb. 20, 1934 |
| 1,961,956 | Bleibtreu et al. | June 5, 1934 |
| 2,192,332 | Schmieg | Mar. 5, 1940 |
| 2,565,596 | Cox | Aug. 28, 1951 |
| 2,586,692 | Morel | Feb. 19, 1952 |